2,928,603

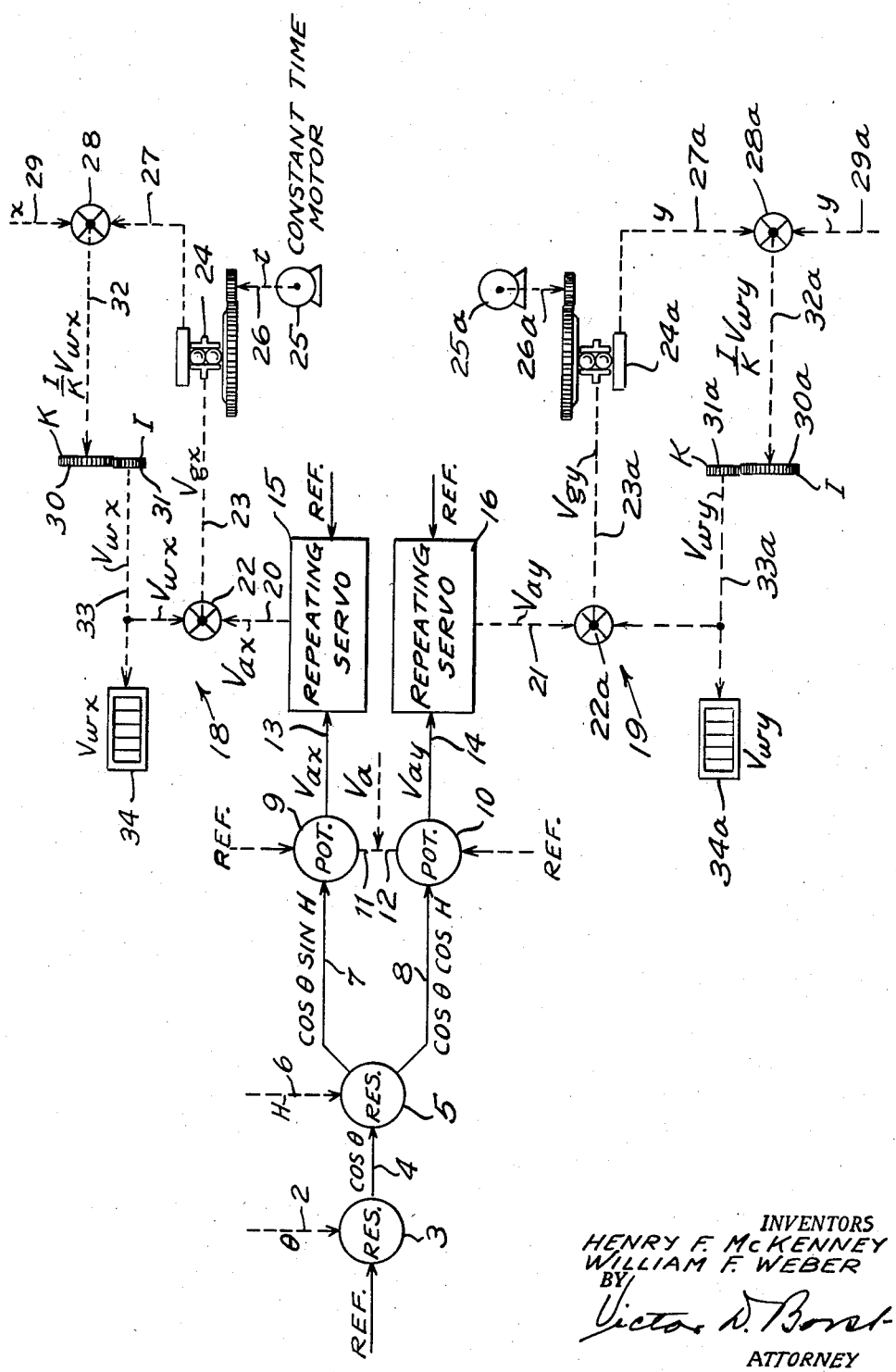

AIRBORNE WIND COMPUTER

Henry F. McKenney, Greenwich, Conn., and William F. Weber, Greenlawn, N.Y., assignors to Sperry Rand Corporation, Ford Instrument Company Division, Long Island City, N.Y., a corporation of Delaware Application July 18, 1956, Serial No. 598,608

3 Claims. (Cl. 235—189)

This invention relates to a computer for continuously and automatically determining components of wind velocity, the computer having particular application to aircraft navigation and armament systems.

In general, the invention contemplates a closed loop system which is adapted to receive analog values of ground position and airspeed, compare the rates of change in position as derived from the two analog values and stabilize the rates of change by feeding back the resulting compared rates as an error factor to be combined with the analog value of airspeed, thereby establishing in the feed back line correct values for the desired wind velocity components. Preselected time constants are built into the mechanism which are sufficiently large to avoid unwanted response to gusts, but sufficiently short to provide a continuous measure of instantaneous wind.

A principal object of the invention is to provide an automatic and continuous wind computer which is capable of local measurement rather than measurement at the locations and altitudes of remote test points. Other objects and advantages of the device may be appreciated on reading the following detailed description taken in conjunction with the accompanying figure which schematically illustrates one embodiment of the invention.

Airspeed $Va$ is resolved into its two horizontal components $Vax$ and $Vay$ in accordance with the formulae:

(1) $\quad\quad Vax = Va \cos \theta \sin H$
(2) $\quad\quad Vay = Va \cos \theta \cos H$ where $\theta$ is dive angle and $H$ is heading. In accordance therewith shaft 2 which is settable in accordance with dive angle $\theta$ is employed to orient resolver 3 which yields the analog quantity $\cos \theta$ on lead 4. Resolver 5 is energized by the lead 4 and is driven by shaft 6, which is settable in accordance with heading H. Leads 7 and 8 on which there is represented the analog values $\cos \theta \sin H$ and $\cos \theta \cos H$, respectively, connect the outputs of resolver 5 to potentiometers 9 and 10, respectively, the center taps of which are positioned by shafts 11 and 12 which are adapted to be driven in accordance with airspeed $Va$. Leads 13 and 14 connect the potentiometers 9 and 10 to repeating servos 15 and 16, the airspeed components $Vax$ and $Vay$ being conveyed to the closed loop wind computing devices 18 and 19, on shafts 20 and 21, respectively.

The wind computer 18 is similar to the wind computer 19 yielding $x$ and $y$ components of wind velocity, respectively, and therefore the computer 19 will be assigned the same reference numerals except elements in the device 19 corresponding to elements in the device 18 have the subscript $a$ after their numerals.

One side of differential 22 is driven by the shaft 20. The output or spider shaft 23 of differential 22 positions the carriage of the integrator 24 the disc of which is driven by constant time motor 25 and motor shaft 26. Roller shaft 27 feeds the output of the integrator 24 to one side of differential 28. The shaft 29 drives the other side of the differential 28 and is settable in accordance with the $x$ component of ground position determined as by a coordinate converter device or Doppler radar system. A driving gear 30 is driven by the output shaft 32 of the differential 28 and a feedback shaft 33 connects driven gear 31 to the other side of the differential 22. A counter 34 is driven by the shaft 33 and registers the $x$ component of horizontal wind velocity. Similarly counter 34a indicates the $y$ component of horizontal wind velocity.

The loop systems depend for their mode of operation on the following relationships:

(3) $\quad\quad Vgx = Vax + Vwx$
(4) $\quad\quad Vgy = Vay + Vwy$ where $Vgx$ and $Vgy$ are ground velocity components, $Vax$ and $Vay$ are airspeed components and $Vwx$ and $Vwy$ are wind velocity components along the $x$ and $y$ axes respectively. Wind computation is based on a comparison of the $x$ and $y$ position components placed in differentials 28 and differential 28a with the position components resulting from true airspeed integration. The systems are stabilized when the carriages of integrators 24 and integrator 24a remain stationary. This will occur when the integrator inputs are stationary. Assuming a constant value of $Vax$ and $Vay$, the integrator inputs will be stationary when the error factors, which are fed to the differentials 22 and 22a representing the output of the differentials 28 and 28a are stationary. In order for this to happen, however, the inputs to the differentials 28 and 28a must change at the same rate which requires that the integrated output of the differentials 22 and 22a be instantaneously equal to the corresponding component of ground position. This condition will obtain where the error factors are established as wind velocity components and the integrator inputs are equal to one of the components of ground velocity in accordance with Equation 3 and Equation 4.

The time constant of the system may be selected arbitrarily by varying the ratio K of the gears 30 and 31 and the gears 30a and 31a in the loop systems. The constant of integration K which shows up in the integrator output as $1/K\ Vwx$ and $1/K\ Vwy$ is removed by the gears in the two loop systems. The differential equations governing the system computer of V wind velocity is $$1/K \frac{du}{dt} + u = Vwx$$

where $u$ is the quantity which is taken as a measure of $Vwx$. The solution is $$u = \int_0^t W(T) Vwx(T) dT + u_0 e^{-Kt}$$

where $u_0 e^{-Kt}$ is a disappearing transient and $W(T)$ is a weighting function defined by $$W(T) = K e^{-K(t-T)}$$

The time constant of the system is therefore $$\frac{1}{K}$$

and thus may be selected at will by varying the gear ratio K. The differential equation governing the system computation of $Vwy$ is similar to that of $Vwx$ with obvious variations of subscript.

It should be understood that the invention is not to be limited to the device including airspeed computer as disclosed above but should be construed solely in accordance with the following claims.

What is claimed is:

1. Means adapted to be borne by an aircraft for computing a component of wind velocity comprising means for computing the cosine of the dive angle of the craft and a trigonometric function of the heading angle of the craft, means for multiplying said two quantities, means for multiplying the product of air speed of the craft, thereby obtaining a component of air speed, a differential, means to introduce said component of air speed into the differential, means to integrate the output of the differential against time, means for obtaining the difference of a component of observed ground position and the output of the integrating means and means for introducing the said difference into the differential.

2. Computing means as defined in claim 1 in which the trigonometric function of the heading angle is the sine of the angle and the component of observed ground position is the $x$ component.

3. Computing means as defined in claim 1 in which the trigonometric function of the heading angle is the cosine of the angle and the component of observed ground position is the $y$ component.

References Cited in the file of this patent

UNITED STATES PATENTS

| | | |
|---|---|---|
| 2,388,680 | Dawson | Nov. 13, 1945 |
| 2,492,355 | Campbell et al. | Dec. 27, 1949 |